(12) United States Patent
Desai

(10) Patent No.: US 6,495,206 B1
(45) Date of Patent: Dec. 17, 2002

(54) METHOD OF MAKING AN EXPANED EXTRUDED POLYMERIC TEXTILE

(75) Inventor: Dilipkumar R. Desai, Cornwall (CA)

(73) Assignee: Morbern, Inc. (CA)

( * ) Notice: Subject to any disclaimer, the term of this patent is extended or adjusted under 35 U.S.C. 154(b) by 0 days.

(21) Appl. No.: 09/482,953

(22) Filed: Jan. 14, 2000

(51) Int. Cl.$^7$ ................................................ B32B 5/18
(52) U.S. Cl. ............. 427/243; 156/244.11; 156/244.27; 427/365
(58) Field of Search ........................ 156/78, 79, 244.11, 156/244.12, 244.26, 244.27, 555; 264/45.5, 45.9, 46.1, 46.3, DIG. 5; 427/243, 245, 365, 428

(56) References Cited

U.S. PATENT DOCUMENTS 3,032,828 A * 5/1962 Bethe et al. .................. 156/78
3,616,170 A * 10/1971 Closson, Jr. ............... 12/146 D
3,735,511 A * 5/1973 Gilbert et al. ................ 36/19.5
5,418,257 A * 5/1995 Weisman ..................... 521/137
6,103,152 A * 8/2000 Gehlsen et al. ............ 264/45.4

FOREIGN PATENT DOCUMENTS

GB           1264852      *  2/1972

* cited by examiner

Primary Examiner—Michael W. Ball
Assistant Examiner—Barbara J Musser
(74) Attorney, Agent, or Firm—David J. French

(57) ABSTRACT

A method of extruding a foamed plastic layer into a fabric carrier that relies on the use of dual expanding agents, a dispersed gas generant and thermally expandable microspheres. Upon deposit of the foaming melt onto the carrier, the composite textile is passed through a rotating gate wherein the expanding foam is contained between a roller and the carrier. Penetration and engagement of the foaming matrix with the carrier is thereby enhanced. The resulting product is resilient with good compression rebound.

26 Claims, 3 Drawing Sheets

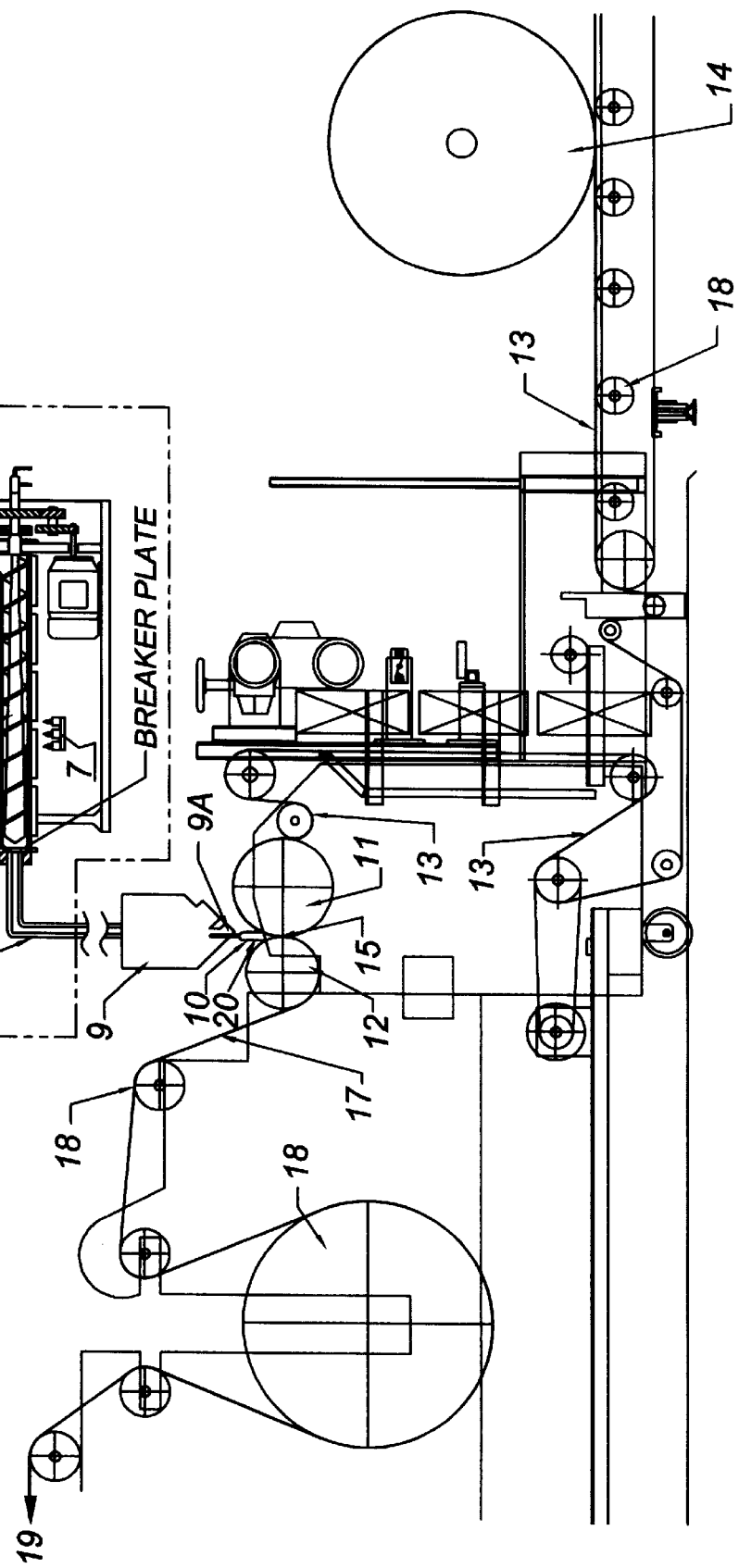

METHOD OF MAKING AN EXPANED EXTRUDED POLYMERIC TEXTILE

FIELD OF THE INVENTION

This invention relates to the field of textiles. In particular, it relates to textiles wherein a polymeric "plastic" layer is bonded to a fabric substrate, and the plastic layer is in the form of a foamed matrix.

BACKGROUND TO THE INVENTION

In the production of plastic coated textiles, the product has customarily been made by one of the following alternate procedures:

1) casting a molten plastic layer onto a fabric carrier;
2) bonding a pre-formed plastic layer onto a fabric carrier by calendering and/or use of adhesives; and
3) extruding a molten plastic layer onto a fabric carrier.

When it has been intended to provide a plastic layer that is "foamed" and resilient due to included gas-filled cells or voids, it has been customary to create the expanded plastic matrix in two stages. First a plastic layer containing a blowing agent in a quiescent state is cast onto a fabric carrier. Then the formed composite textile is exposed to heat which causes gas to evolve within the plastic layer—the process of "blowing".

A disadvantage of this latter process is that the level of heat that is required to activate the blowing agent will cause carrier components in many types of fabric carriers to fuse, e.g. polyethylene will fuse at 175° F., whereas various types of chemical blowing agents require a temperature in excess of 300° F. to create foaming conditions.

Attempts have been made to incorporate a blowing agent into an extruded plastic to form a foamed plastic layer. However, with the use of conventional chemical blowing agents, this process produces often a textile wherein the foamed polymeric layer lacks resistance to crushing and results in a flattened polymeric layer that has almost no or little foam voids left in the structure after crushing. In a standard extrusion procedure, a chilled calendaring roll presses the extruded sheet of a melt into a fabric carrier and sets, and bonds, the plastic layer with the textile. Extruded textiles prepared with typical classic blowing agents have typically lacked the resilience to recover sufficiently from this compression step to provide a satisfactorily foamed textile.

A need exists for a foamed plastic composite textile that is formed on a permeable carrier, e.g. a woven, knitted or non-woven fabric, with a low fusing temperature, while exhibiting good recovery or resilience in response to applied pressure. This invention addresses this need as well as providing other advantages.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one aspect of the invention, a method of producing a foamed sheet textile is provided:

1) extruding a heated, extrudable polymeric melt from a linear extrusion die in the form of a sheet with two faces, the melt containing as expanding agents:
   1) a first extrusion activated gas source dispersed within said melt; and
   2) thermally expandable micro-spheres having encapsulating shells each containing compressed gas and being dispersed within said melt
2) allowing the expanding agents to commence to expand, with the gas source generating gases to form a compressible foamed matrix in the melt and the microcapsules expanding into resilient, compression resistant micro-spheres suspended within said foamed matrix, thereby providing a foaming melt;
3) depositing the foaming melt onto the surface of a permeable carrier that is in sheet form and into the surface of which the foaming melt partially penetrates; and
4) allowing the foaming melt so formed to set to provide a resilient, compression-resistant, foamed plastic/polymeric layer that is bonded to the carrier to form the resulting textile.

Preferably, the extrusion melt, upon being laid-down on the permeable carrier, is carried on the carrier through a rotating gate defined by a gap between two rollers, one of the rollers being cooled to set the melt. This establishes a constant height for the foamed layer on the textile. The roller delivering the carrier may be powered, and the second cooled roller may be traction-driven off of the powered roller by end-rims extending from the second roller.

The resulting product of the invention is a textile having a permeable carrier into the surface of which the foamed plastic layer has expanded while still molten and while the expanding agents, and particularly the encapsulated expanding agent, is still expanding. Thus, the boundary surface of the carrier is at least partially embedded within the foamed plastic/polymeric layer. Expansion of the foaming layer both above and within the carrier may continue after the formed textile exits the rotating gate, and particularly while the foaming melt is confined between the carrier and the second of the two rollers for an interval of rotation of the second roller.

By inclusion of thermally expandable micro-spheres in the melt the foamed plastic layer contains inclusions of thermally expanded hollow micro-spheres having encapsulating shells that are resiliently compressible. This enhances the crushability of the textile.

An advantage of this process is that polymers like PVC, polypropylene, polyethylene and other conventional polymers may be used to provide the foamed plastic layer.

Further, a textile may be produced with an integrally-formed skin region present at it's polymer surface, the skin region containing less voids than the intermediate region of the foamed layer lying between the skin region and the carrier. This is accomplished by cooling the extrusion die through which the melt is extruded and/or cooling the roller that contacts the foaming melt as such melt passes through and beyond the gap of the rotating gate.

An advantage of this process is that a textile can be produced at lower temperatures wherein the carrier would otherwise plastically deform at temperatures above, for example, 300 degrees Fahrenheit, or even 200 degrees Fahrenheit.

To produce the textile, the extruder is fed with a composition suitable for generating a foamed polymer comprising:

1) at least one expandable thermoplastic polymer capable of being extruded;

2) a first thermally activated gas generant dispersed within said polymer; and 3) thermally expandable resiliently compressible micro-spheres, disbursed within said polymer;

said generant and micro-spheres being capable on heating of expanding said polymer.

The foregoing summarizes the principal features of the invention and some of its optional aspects. The invention may be further understood by the description of the preferred embodiments, in conjunction with the drawings, which now follow.

SUMMARY OF THE FIGURES

FIG. 1 is a schematic side view of an extrusion coating line.

FIG. 2 is a cross-sectional side view of an extrusion screw.

DESCRIPTION OF THE PREFERRED EMBODIMENT

Figure 3:
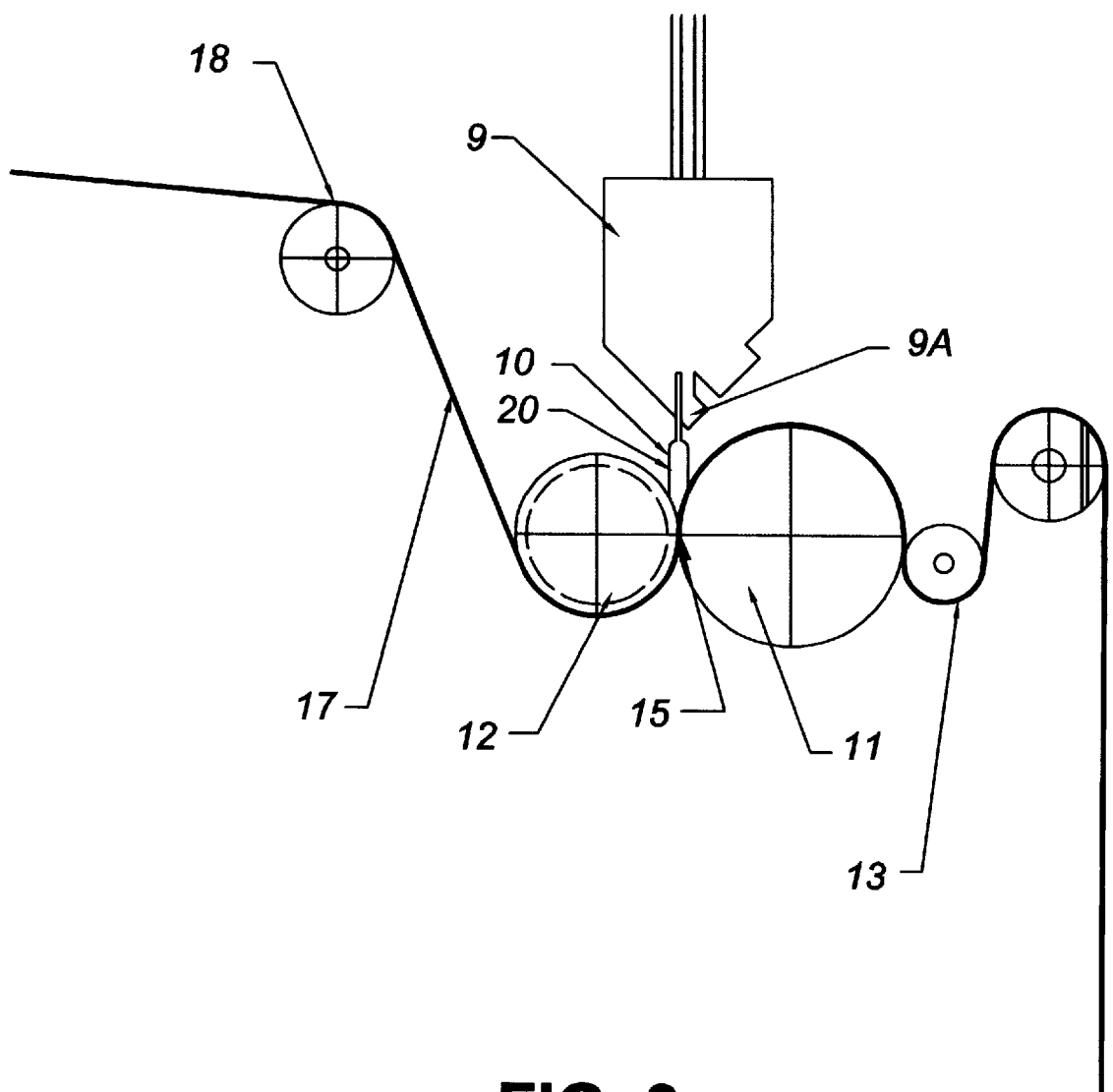
FIG. 3 is an enlarged, detailed side-view of the extrusion die and dual counter-rotating rollers of FIG. 1 between which the foaming melt is being fed.

In FIGS. 1 and 2 a powdered plastic composition 2 in powder/pellet form is fed into the feed-hopper 3 of a spiral extruder screw 4. The gap around the spiraled flights 5 of the screw 4 decreases in width proceeding towards the extruder outlet 6 thus creating an increasing pressure on the melt 8 contained therein. Heat is applied externally from a heat source 7 such as hot oils, gas flames or electric radiant heating coils to convert the powdered composition 2 to a melt 8.

Molten plastic composition or "melt" 8 passes from the extruder outlet 6 to the extrusion die 9 where the pressure that previously arrested the release of gas by the gas generants (not shown in FIG. 2) is relaxed, allowing the gas generants to "blow" and produce a foamed melt 10. This foaming melt 10 is fed into the nip 15 between two counter rotating rollers 11,12.

One of the rollers 11, preferably a powered roller 11, carries a sheet of a permeable, preferable fabric or fibrous matrix of porous, carrier material 13 from a carrier-source roller 14 to the nip 15. The other roller 12, preferably driven in a counter rotating direction by friction off of the powered roller 11, provides a gap 16 having a pre-determined diameter at the nip 15 which services as a gate for metering the thickness of foaming melt 10 that is laid down on the carrier sheet 13. Desirably, the roller 12 has a protruding circumferential end rim 25 positioned to bear against an interface 26 between the first and second rollers 11,12 whereby a traction drive effect occurs. Preferably, this "gating" roller 12 is temperature controlled, e.g. chilled as by circulating chilling fluid coolant, (not shown) or other suitable method of cooling in the normal manner known for extrusion processes.

Preferably, the die 9 is also cooled, as by cooling air, to form a skin 20 surface on the foamed melt 10 as it leaves the die lips 9A. This skin 20 has less voids than the core of the foamed layer, e.g. 50% or less.

In the gap 16 the foaming melt 10 continues its expansion, having infiltrated or mixed with the boundary surface of the carrier 13 to thereafter set therein. The composite textile 17 exits the two rollers 11, 12 whereafter the foaming melt is preferably confined between the carrier and the second of said rollers. The composite textile 17 is then carried by a series of conveying and/or cooling rollers 18 to a textile take-up roll. Some partial expansion of the foamed layer 10 may occur while the textile 17 is proceeding to and is present on the conveying rollers 18, as well as the expansion within the carrier 13 that continues after the composite textile 17 has passed beyond the gap.

In the above process, the powdered plastic compositions 2 may be a polymeric vinyl compound, a polypropylene compound, a polyethylene compound, thermoplastic polyurethane or other known and conventional polymeric material, or combinations thereof, for producing foamed plastic sheet textiles. In particular, the plastic composition 2 may include dual expansion agents, comprising:

1) a dispersed blowing agent or gas generant such as azodicarbonamide or other chemical blowing agents;

2) a micro-encapsulated expansion agent such as EXPANDCEL-™ (by Casco Nobel AB of Sweden cf U.S. Pat. No. 5,585,119) or such other encapsulated expansion agents which upon foaming provides compression-resistant micro-spheres within the plastic layer of the final textile 17; and 3) the compound may or may-not contain an additional, direct gas-injected blowing agent.

A typical composition of this invention which is extrudable may contain one or more conventional additives such as fillers, plasticisers, stabilizers, anti-oxidants, lubricants and processing aids. Such additives can be used in conventional quantities for formulating an extrudable composition. As additives, this composition 2 may include conventional binders, such as an acrylic and/or a nitrile rubber, or like elastomers that serve to constrain and delay the expansion of the foaming melt 10.

By way of exemplification, the following table shows a typical composition which can be used in accordance with this invention. It is highly desirable that all additives and components of the composition be chlorine-free.

TABLE

| COMPOUND | WEIGHT IN MIXTURE Preferred |
|---|---|
| Polymer: - PVC | 136 pounds |
| Filler: | 40.7 pounds |
| e.g. (Omyacarb) (TM) | |
| Micro-encapsulating blowing agent: | 1.0 pounds |
| e.g. (Expancel 092) (TM) | |
| Dispersed blowing agent: | 4.1 pounds |
| e.g. (Celogen 754A) (TM) | |
| Plasticizer/Co-stabilizer: | 102 pounds |
| e.g. (Soy Bean Oil) | |
| Stabilizer: | 3.7 pounds |
| e.g. (Nuostabe) (TM) | |
| Anti-oxident: | 0.3 pounds |
| e.g. (Irganox) (TM) | |
| Lubricants: | 3.3 pounds |
| e.g. (Internal/external-stearic acid, "Loxiol (TM) "and Hostalub (TM) | |
| Process Aid: | 6.8 pounds |
| e.g. Paralord- (K12ON) (TM) | |

The resulting textile 17 is thereby rendered resilient and crush resistant. This textile may be further processed by pressure and/or vacuum-forming or injection molding without the foam layer being crushed or destroyed.

Figure 4:
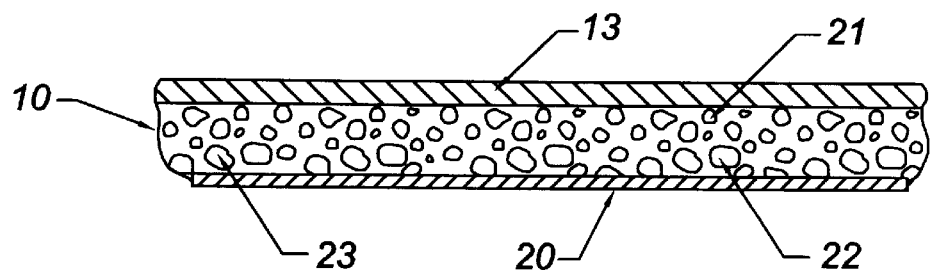
FIG. 4 is a diagrammatic cross-sectional side view of the foamed polymeric layer bonded to a fabric carrier.
Figure 5:
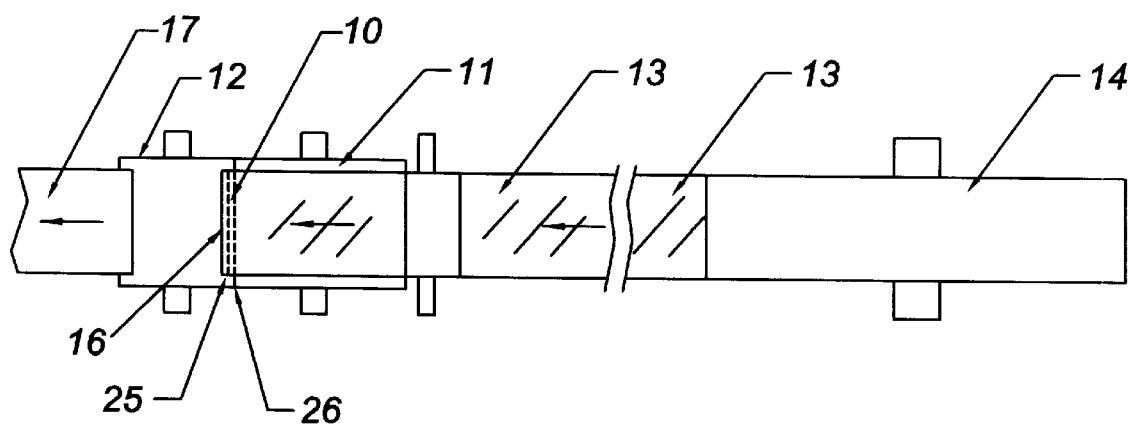
FIG. 5 is a cross-sectional view through the pair of rollers receiving and combining the melt with the fabric.

A sample textile 17 is depicted in FIG. 4 wherein the foamed layer 10 is bonded to the carrier 13. Within the foamed layer 10 are two types of voids: voids 21 in the foamed matrix produced by the dispersed gas generant; and voids 22 present within expanded micro-spheres 23. Each micro-sphere 23 has an encapsulating shell of resilient, compression resistant material. The presence of two types of voids 21, 22 improves the character and "feel" of the final textile product 17.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

I claim:

1. A method of producing a foamed sheet textile comprising:
   a) extruding a heated, extrudable, thermoplastic polymeric melt from a linear extrusion die in the form of a sheet or film with two faces, the melt containing as expanding agents:
      i) a first extrusion-activated gas source dispersed within said melt; and
      ii) thermally expandable micro-spheres having encapsulating shells dispersed within said melt;
   b) allowing the expanding agents to commence expanding upon exiting the die, with the gas source providing gases to form a compressible foamed matrix in the melt and the micro-spheres expanding into compression resistant, expanded micro-spheres suspended within said foamed matrix, thereby providing a foaming melt;
   c) depositing the foaming melt onto the surface of a permeable fabric carrier in sheet form to allow a first face of the foaming melt to be positioned to at least partially penetrate said carrier surface;
   d) advancing the permeable fabric carrier with the foaming melt present on its surface to paired first and second counter-rotating rollers having a restricting gap there between to serve as a rotating gate, the first of said rollers conveying the permeable carrier through said gap, the second of said two rollers contacting a second face of the foaming melt to confine the foaming melt between the carrier and the second of said two rollers
   e) causing the foaming melt as it is passed through the gap and is still foaming:
      i) to be restricted by the gap to thereby limit the height of the melt deposited on the carrier, and
      ii) to penetrate into the surface of the carrier; and
   f) allowing the foaming melt so formed to set to provide a flexible, resilient, compression-resistant, foamed polymeric layer that is bonded to the carrier to form the resulting textile.

2. A method as in claim 1 including the step of confining the foaming melt between the carrier and the second of said two rollers, as it passes beyond the gap, thereby continuing contact between the foaming melt and the second of said rollers for an interval of rotation of said second roller.

3. A method as in claim 2 in combination with cooling means whereby a skin layer of partially set melt is formed on said second face of the sheet or film by the time it has passed beyond said second roller.

4. A method as in claim 3 wherein said cooling means comprises cooling fluid circulated within the second roller.

5. A method as in claim 4 wherein said cooling means comprises cooling air directed at the second side of the melt as it exits the die.

6. A method as in claim 3 wherein the melt deposited on the carrier maintains sufficient temperature after passing through the gate to permit the melt to continue to expand within the carrier after passing through the gate.

7. A method as in claim 6 wherein the melt deposited on the carrier maintains sufficient temperature after passing through the gate to permit the melt to expand its height above the carrier after passing beyond contact with the second roller.

8. A method as in claim 6 wherein the carrier is a fibrous textile.

9. A method as in claim 3 wherein said carrier comprises material which has a fusing temperature of 300° F. or lower.

10. A method as in claim 3 wherein said carrier comprises material which has a fusing temperature of 200° F. or lower.

11. A method as in any one of claims 1, 2, 3, 4, 5, 6, 7, 8, 9 or 10 wherein the melt comprises rubber or elastomers and further comprises as its principal polymeric component other than such rubber or elastomers a polymeric composition selected from the group of compounds consisting of polyvinyl chloride polymer or copolymer, polyethylene, polypropylene, thermoplastic polyurethane and combinations thereof.

12. A method as in claim 11 wherein the principal polymeric component of the melt other than rubber or elastomers comprises principally polyvinyl chloride polymer or copolymer in combination with additives.

13. A method as in claim 11 wherein the polymeric components of the melt are substantially chlorine-free.

14. A method as in claim 11 wherein the principal polymeric component of the melt other than rubber or elastomers comprises principally polypropylene in combination with additives.

15. A method as in claim 11 wherein the principal polymeric component of the melt other than rubber or elastomers comprises principally polypropylene in combination with additives.

16. A method as in any one of claims 1, 2, 3, 4, 5, 6, 7, 8, 9 or 10 wherein said melt comprises elastomers as a binder to constrain and delay the expansion of the foaming melt.

17. A method as in claim 1 wherein the first roller drives the second roller at a synchronized speed to minimize shear forces applied to the expanding melt sheet or film.

18. A method as in claim 17 wherein the first roller is powered and has protruding circumferential end rims which bear upon the second roller thereby actuating the second roller by traction.

19. A method as in claim 1 in combination with cooling means whereby a skin layer of partially set melt is formed on said second face of the sheet or film by the time it has passed beyond said second roller.

20. A method as in claim 19 wherein said cooling means comprises cooling fluid circulated within the second roller.

21. A method as in claim 20 wherein said cooling means comprises cooling air directed at the second side of the melt as it exits the die.

22. A method as in claim 19 wherein the melt deposited on the carrier maintains sufficient temperature after passing through the gate to permit the melt to continue to expand within the carrier after passing through the gate.

23. A method as in claim 22 wherein the melt deposited on the carrier maintains sufficient temperature after passing through the gate to permit the melt to expand its height above the carrier after passing beyond contact with the second roller.

24. A method as in claim 22 wherein the carrier is a fibrous textile.

25. A method as in claim 19 wherein said carrier comprises material which has a fusing temperature of 300° F. or lower.

26. A method as in claim 19 wherein said carrier comprises material which has a fusing temperature of 200° F. or lower.

* * * * *